(12) United States Patent
Tanaka (10) Patent No.: US 9,983,440 B2
(45) Date of Patent: May 29, 2018

(54) DISPLAY DEVICE

(71) Applicant: Japan Display Inc., Tokyo (JP)

(72) Inventor: Shinichiro Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days. days.

(21) Appl. No.: 15/450,418

(22) Filed: Mar. 6, 2017

(65) Prior Publication Data

US 2017/0261792 A1  Sep. 14, 2017

(30) Foreign Application Priority Data

Mar. 10, 2016 (JP) ................................ 2016-047202

(51) Int. Cl.
| | |
|---|---|
| *G02F 1/1335* | (2006.01) |
| *G02F 1/1343* | (2006.01) |
| *G02F 1/1337* | (2006.01) |
| *G02F 1/13363* | (2006.01) |
| *G02F 1/1333* | (2006.01) |

(52) U.S. Cl.
CPC .... *G02F 1/13363* (2013.01); *G02F 1/133514* (2013.01); *G02F 1/133305* (2013.01); *G02F 1/133753* (2013.01); *G02F 1/134363* (2013.01); *G02F 2001/133519* (2013.01); *G02F 2001/133631* (2013.01); *G02F 2201/56* (2013.01); *G02F 2413/02* (2013.01)

(58) Field of Classification Search
CPC ......... G02F 1/133305; G02F 1/134363; G02F 1/13363
USPC ......................................................... 349/141
See application file for complete search history.

(56) References Cited

U.S. PATENT DOCUMENTS

| | | | |
|---|---|---|---|
| 2007/0058118 A1* | 3/2007 | Cirkel ............... | G02F 1/133305 349/117 |
| 2009/0096965 A1* | 4/2009 | Nagata .............. | G02F 1/133305 349/103 |

FOREIGN PATENT DOCUMENTS

| | | |
|---|---|---|
| JP | 2010-256680 A | 11/2010 |
| JP | 2013-050535 A | 3/2013 |

* cited by examiner

*Primary Examiner* — Wen-Ying P Chen
(74) *Attorney, Agent, or Firm* — K&L Gates LLP (57) ABSTRACT

A display device according to one aspect of the present invention includes a liquid crystal panel including a curved display screen, and a phase compensation member provided at a position corresponding to each of corner portions of the curved display screen.

8 Claims, 5 Drawing Sheets

DISPLAY DEVICE

CROSS-REFERENCE TO RELATED APPLICATIONS

This application claims priority from Japanese Application No. 2016-047202, filed on Mar. 10, 2016, the contents of which are incorporated by reference herein in its entirety.

BACKGROUND

1. Technical Field

The present disclosure relates to a display device.

2. Description of the Related Art

There is a known display device in which a display panel is curved (for example, refer to Japanese Patent Application Laid-open Publication No. 2010-256680 (hereinafter referred to as "Patent Literature 1") and Japanese Patent Application Laid-open Publication No. 2013-050535 (hereinafter referred to as "Patent Literature 2")). The display device of this type is referred to as a curved display. An exemplary display panel to be used is a liquid crystal panel.

When the liquid crystal panel is curved, birefringence occurs at an end portion of a substrate of the liquid crystal panel due to the stress generated at the time of curving. This might lead to light leakage at a corner portion of a display screen. To cope with this, the Patent Literature 1 describes arrangement of an optical compensation layer for canceling a phase difference due to birefringence, on an entire display screen. This configuration, however, arranges the optical compensation layer at a central portion of the display screen, at which little birefringence would occur, and thus, leads to significant deterioration of display quality. In the Patent Literature 2, the degree of curving is reduced solely on the corner portion of the liquid crystal panel. This configuration, however, restricts design of the liquid crystal panel.

SUMMARY

A display device according to one aspect of the present invention includes: a liquid crystal panel including a curved display screen; and a phase compensation member provided at a position corresponding to each of corner portions of the curved display screen.

DETAILED DESCRIPTION

Embodiments of the invention will be described in detail with reference to the drawings. The present invention is not intended to be limited to the following embodiments. The constituents described below include those constituents that could be easily conceived by a person skilled in the art, and constituents that are substantially identical to those described herein. Furthermore, it is possible to combine the constituents described below as appropriate. The disclosure is merely an example, and those which may readily occur to those skilled in the art about appropriate changes while maintaining the spirit of the invention are naturally included in the scope of the present invention. To clarify the description, there are cases where the drawings include more schematic illustrations of widths, thicknesses, and shapes of individual portions compared with the actual modes. This, however, is merely an example and would not limit the interpretation of the present invention. In some cases, the present description and drawings use same reference numerals for components similar to those previously described with reference to an earlier drawing and might omit the detailed description as appropriate.

First Embodiment

Figure 1:
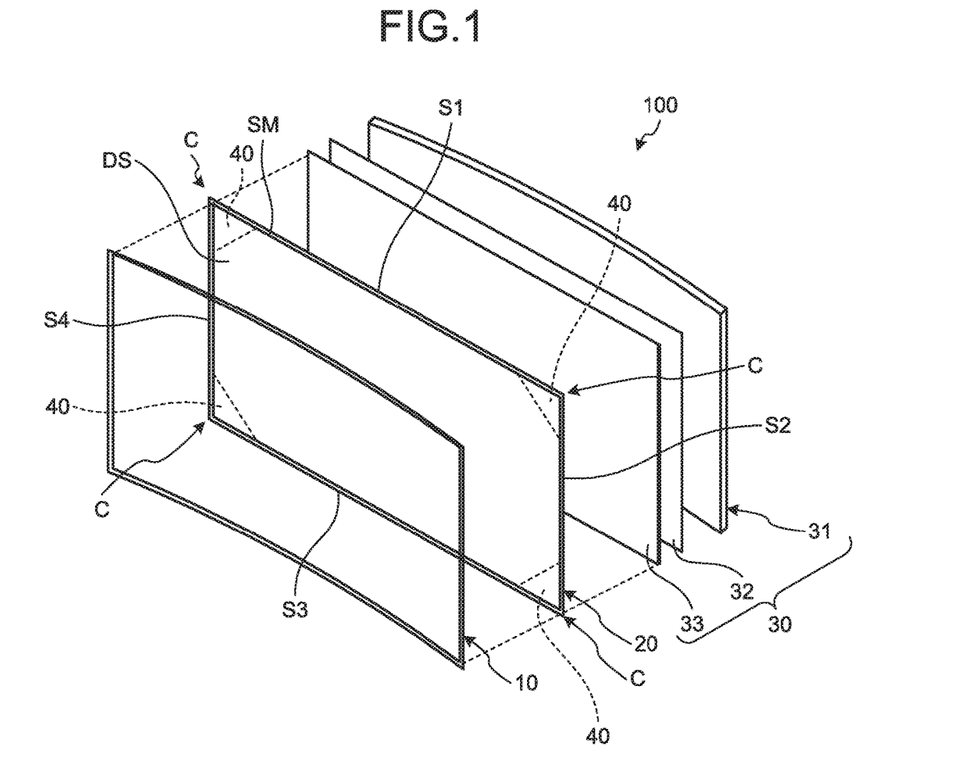
FIG. 1 is an exploded perspective view illustrating a schematic configuration of a display device according to a first embodiment.
Figure 2:
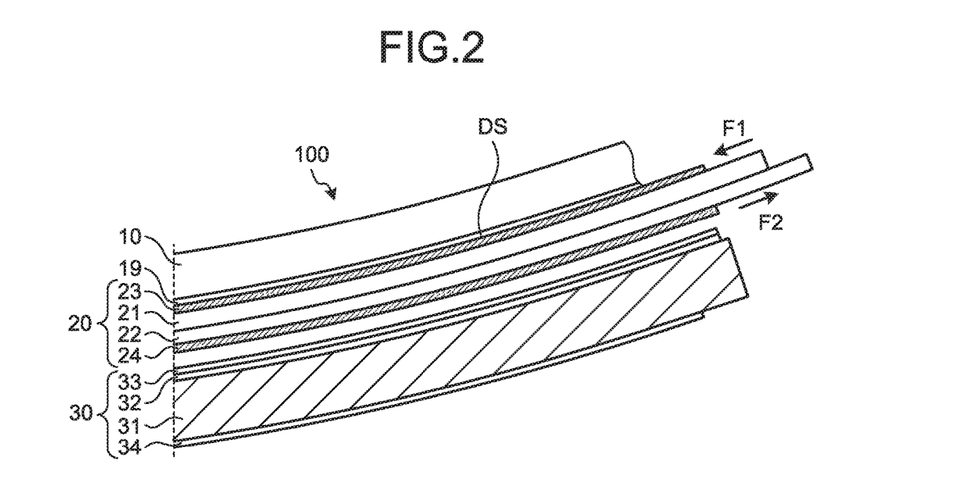
FIG. 2 is an enlarged cross-sectional view of an end portion of the display device.

FIG. 1 is an exploded perspective view illustrating a schematic configuration of a display device 100 according to a first embodiment. FIG. 2 is an enlarged cross-sectional view of an end portion of the display device 100.

As illustrated in FIG. 1, the display device 100 includes a cover member 10, a liquid crystal panel 20, and a backlight 30.

The cover member 10 is formed with a transparent substrate such as a glass substrate and a plastic substrate. The cover member 10 is arranged on a front surface side of the liquid crystal panel 20 and protects a display screen DS of the liquid crystal panel 20. The display screen DS has a rectangular shape, for example, with a first side S1 as a long side and a second side S2 as a short side. The cover member 10 is curved, for example, such that both end portions located oppositely to each other in a direction parallel to the first side S1 protrude onto a front surface side relative to a central portion. The liquid crystal panel 20 is fixed to the cover member 10, in a state of curving along a curved surface of the cover member 10.

As illustrated in FIG. 2, the liquid crystal panel 20 includes a first substrate 21, a second substrate 22, a first polarizing plate 23, and a second polarizing plate 24. The first substrate 21 and the second substrate 22 are formed of photoelastic material such as glass. The second substrate 22 and the first substrate 21 are arranged oppositely to each other. A liquid crystal layer 25 (refer to FIG. 3) is arranged between the first substrate 21 and the second substrate 22. The outer periphery of the liquid crystal layer 25 is sealed with a sealing material SM (refer to FIG. 1).

The first polarizing plate 23 is adhered to the first substrate 21. The second polarizing plate 24 is adhered to the second substrate 22. The cover member 10 is adhered to the first polarizing plate 23 of the liquid crystal panel 20 via an adhesion layer 19. A display region is provided at a central portion of a region surrounded by the sealing material SM. The most outer surface (e.g., surface of the first polarizing plate 23) of the liquid crystal panel 20 disposed oppositely to the display region is the display screen DS.

The backlight 30 is arranged on a back surface side of the liquid crystal panel 20. Examples of the backlight 30 include, but are not limited to, a light guide plate 31 and a plurality of optical sheets. In the present embodiment, examples of the plurality of optical sheets include, but are not limited to, a prism sheet 32 and a diffusion sheet 33 stacked on the front surface side of the light guide plate 31, and a reflection sheet 34 arranged on a back surface side of the light guide plate 31. The backlight 30 is curved along the curved shape of the liquid crystal panel 20.

The liquid crystal panel 20 includes the display screen DS that is curved along the curved surface of the cover member 10. A viewer views an image displayed on the display screen DS via the cover member 10. The first substrate 21 and the second substrate 22 are adhered with each other using the sealing material SM (refer to FIG. 1). Accordingly, force F1 in a compression direction acts on the both end portions on the first substrate 21, located oppositely to each other in a direction parallel to the first side S1. Force F2 in a tension direction acts on the both end portions on the second substrate 22, located oppositely to each other in a direction parallel to the first side S1.

The force F1 and the force F2 affect optical characteristics of the liquid crystal panel 20. Therefore, in order to reduce the optical effects generated by the force F1 and the force F2, the liquid crystal panel 20 includes a phase compensation member 40 to be described below. In the present embodiment, for simplifying understanding of the configuration of the invention, the following description will be given specifically on an assumption that, for example, the force F2 is very small and optical effects given by the force F2 onto the liquid crystal panel 20 can be disregarded.

Birefringence occurs on the both end portions on the first substrate 21, due to photoelastic effects attributed to the force F1. Accordingly, light that passes through the end portion of the display screen DS includes a phase difference. In a case where black display is performed, light leakage occurs at the end portion of the display screen DS, due to this phase difference. The light leakage is significant on corner portions C of the display screen DS. Accordingly, the phase compensation member 40 is provided at each of the corner portions C of the display screen DS. The phase compensation member 40 reduces the phase difference that occurs at each of the corner portions C of the display screen DS, attributed to the stress at the time of curving of the display screen DS.

Figure 3:
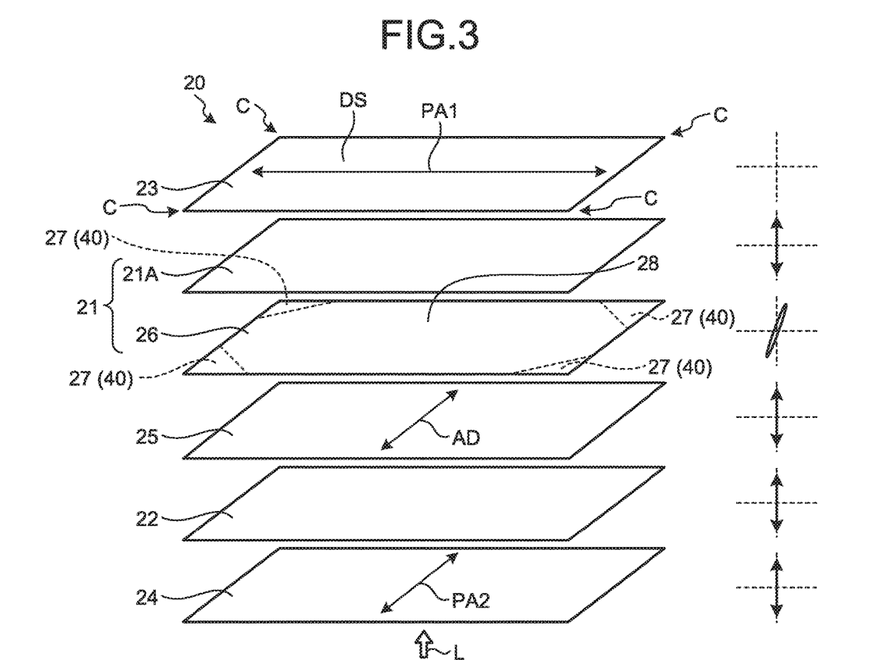
FIG. 3 is a schematic view of a liquid crystal panel.

FIG. 3 is a schematic view of the liquid crystal panel 20. The left side diagram in FIG. 3 is a diagram illustrating a layer structure of the liquid crystal panel 20. The right side diagram in FIG. 3 is a diagram illustrating a polarizing state of light L that passes through the corner portions C at the time of black display. The light L is light emitted from the backlight 30 (refer to FIG. 1) toward the liquid crystal panel 20.

The phase compensation member 40 includes a first phase compensation layer 27 provided, for example, at a position corresponding to the corner portion C of the first substrate 21. The liquid crystal panel 20 includes a first retardation layer 26 provided, for example, across the central portion and each of the corner portions C, of the display screen DS. The first retardation layer 26 provided at a position corresponding to each of the corner portions C has birefringence characteristics. The first retardation layer 26 provided at a position corresponding to the central portion does not have the birefringence characteristics. The first retardation layer 26 provided at each of the corner portions C functions as the first phase compensation layer 27. The first retardation layer 26 provided at a position corresponding to the central portion is an isotropic layer 28 that is optically isotropic.

The first retardation layer 26 is an inner-surface retardation layer provided, for example, on the liquid crystal layer 25 side (inner-surface side) of the first substrate 21. Examples of the first substrate 21 include, but are not limited to, a first base material 21A, and the first retardation layer 26 provided on the liquid crystal layer 25 side of the first base material 21A. Examples of the first substrate 21 include, but are not limited to, a color filter layer provided on the first base material 21A, and an overcoat layer to cover this color filter layer. The overcoat layer functions as the first retardation layer 26, for example.

The first phase compensation layer 27 is formed, for example, by emitting polarized UV light onto the first retardation layer 26 provided at a position corresponding to the corner portion C. For example, when an optically isotropic polymeric membrane is formed on the first base material 21A and polarized UV light is emitted to the polymeric membrane, photoisomerization reaction, photodimerization reaction, or photodecomposition reaction is generated at a UV radiation region, and birefringence characteristics are given. The region to which polarized UV light is not emitted maintains the optically isotropic state. With this process, a plurality of the first phase compensation layers 27 having birefringence characteristics and the isotropic layer 28 that is optically isotropic are formed with a same polymeric membrane.

Figure 4:
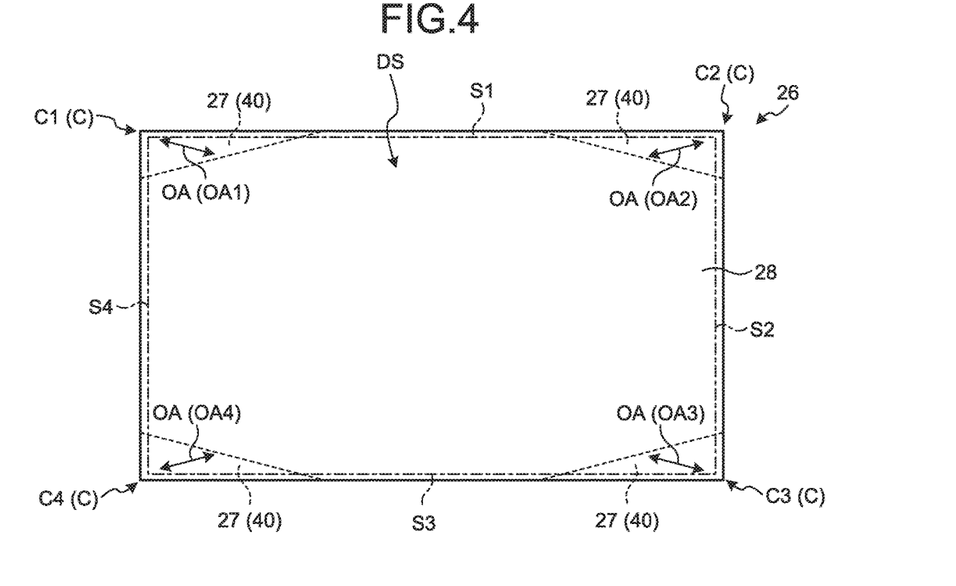
FIG. 4 is a plan view of a first retardation layer.
Figure 5:
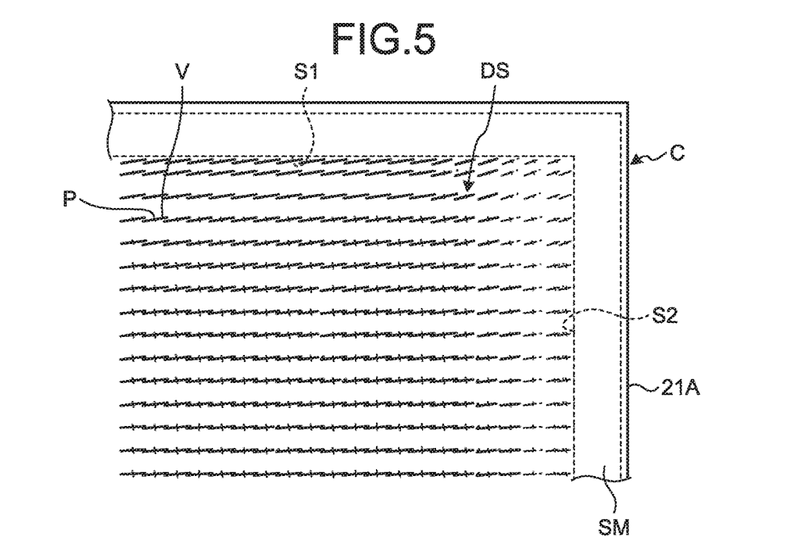
FIG. 5 is a plan view illustrating stress distribution of a first base material, occurring on a corner portion.

FIG. 4 is a plan view of the first retardation layer 26. FIG. 5 is a plan view illustrating stress distribution of the first base material 21A, occurring on the corner portion C. In FIG. 5, the magnitude and direction of the force F1 (refer to FIG. 2) on each of positions P of the first base material 21A is indicated by the length and direction of a stress vector V.

As illustrated in FIG. 5, the stress vector V is directed to a direction slightly tilted with respect to the first side S1. The direction of the stress vector V is a direction directed from the corner portion C toward the central portion of the display screen DS. The magnitude and direction of the stress vector V differ depending on the distances from two sides intersecting on the corner portion C (e.g., first side S1 and second side S2 in FIG. 5). Accordingly, for example, the average magnitude and direction of the stress vector V in each of the positions P are calculated as the magnitude and direction of the force F1 that occurs on the corner portion C.

As illustrated in FIG. 4, the first phase compensation layer 27 is provided at a position corresponding to each of the corner portions C of the first retardation layer 26. The direction of a main axis OA (slow axis or fast axis) and layer thickness of the first phase compensation layer 27 positioned at each of the corner portions C are calculated on the basis of distribution of the force F1 in the compression direction of the first base material 21A, that occurs on each of the corner portions C.

The main axes OA of the first phase compensation layer 27 provided on two adjacent corner portions C are mutually tilted in opposite directions with respect to one side of the display screen DS, the one side connecting the two corner portions C.

For example, a main axis OA1 of the first phase compensation layer 27 provided on a first corner portion C1 and a main axis OA2 of the first phase compensation layer 27 provided on a second corner portion C2 are mutually tilted in opposite directions with respect to the first side S1. The main axis OA2 of the first phase compensation layer 27 provided on the second corner portion C2 and a main axis OA3 of the first phase compensation layer 27 provided on a third corner portion C3 are mutually tilted in opposite directions with respect to the second side S2. The main axis OA3 of the first phase compensation layer 27 provided on the third corner portion C3 and a main axis OA4 of the first phase compensation layer 27 provided on a fourth corner portion C4 are mutually tilted in opposite directions with respect to a third side S3. The main axis OA4 of the first phase compensation layer 27 provided on the fourth corner portion C4 and the main axis OA1 of the first phase compensation layer 27 provided on the first corner portion C1 are mutually tilted in opposite directions with respect to a fourth side S4.

Returning back to FIG. 3, the first substrate 21 and the second substrate 22 have undergone orientation processing, for example, that causes the liquid crystal layer 25 to be horizontally oriented. For example, the directions of orientation processing for the first substrate 21 and the second substrate 22 (e.g., rubbing direction) are parallel with each other. The orientation direction of the liquid crystal layer 25 in an initial orientation state (initial orientation direction AD) is parallel with the direction of orientation processing. The initial orientation direction AD is a direction, for example, parallel with the second side S2 of the display screen DS. A transmission axis PA1 of the first polarizing plate 23 and a transmission axis PA2 of the second polarizing plate 24 are orthogonal to each other. The initial orientation direction AD is parallel, for example, with the transmission axis PA2 of the second polarizing plate 24.

The orientation direction of the liquid crystal layer 25 changes, for example, with an electric field (lateral electric field) in a direction orthogonal to the layer thickness direction of the liquid crystal layer 25. The liquid crystal panel 20 is a lateral electric field system liquid crystal panel on which the orientation direction of liquid crystal molecules changes within a surface orthogonal to the layer thickness direction of the liquid crystal layer 25 due to the lateral electric field. The liquid crystal panel 20 performs black display in the initial orientation state.

Next, a polarization state of the light L on each of the corner portions C at the time of black display will be described with reference to FIG. 3.

The light L emitted from the backlight 30 (refer to FIG. 1) toward the corner portion C is converted into linearly polarized light by the second polarizing plate 24 and becomes incident on the second substrate 22. In the present embodiment, the force F2 that acts on the second substrate 22 is very small, leading to no occurrence of birefringence characteristics on the second substrate 22. Accordingly, the light L that passed through the end portion of the second substrate 22 remains linearly polarized light.

The light L that passed through the end portion of the second substrate 22 becomes incident on the first phase compensation layer 27 via the liquid crystal layer 25. In a case where black display is performed, the orientation direction of the liquid crystal layer 25 is parallel with the transmission axis PA2 of the second polarizing plate 24. Therefore, when the light L incident on the liquid crystal layer 25 is linearly polarized light, the polarization state of the light L does not change.

The light L that passed through the liquid crystal layer 25 is converted into elliptically polarized light by the first phase compensation layer 27. As illustrated in FIG. 2, the force F1 in the compression direction acts on the end portion of the first substrate 21. Therefore, a phase difference occurs at the end portion of the first base material 21A due to the photoelastic effect. The first phase compensation layer 27 gives the light L beforehand the phase difference that cancels the phase difference given to the light L when it passes through the end portion of the first base material 21A. Accordingly, the light L that passed through the first phase compensation layer 27 is converted into linearly polarized light by passing through the end portion of the first base material 21A, and is absorbed by the first polarizing plate 23.

As described above, the display device 100 according to the present embodiment includes the phase compensation member 40 at a position corresponding to each of the corner portions C of the display screen DS. The phase difference that occurs at each of the corner portions C of the display screen DS, attributed to the stress generated at the time of curving of the display screen DS, is reduced by the phase compensation member 40. Accordingly, light leakage is not likely to occur at the corner portion C at the time of performing black display. Since the phase compensation member 40 is selectively arranged at the corner portion C of the display screen DS, an image at the central portion of the display screen DS is not disturbed. Accordingly, it is possible to achieve good image display on the entire display screen DS.

In the present embodiment, the phase compensation member 40 is configured with the first phase compensation layer 27. The first phase compensation layer 27 is formed by emitting polarized UV light to an existing polymeric membrane within the liquid crystal panel 20. There is no need to separately prepare the phase compensation member 40. This simplifies the configuration and reduces the number of components.

Second Embodiment

Figure 6:
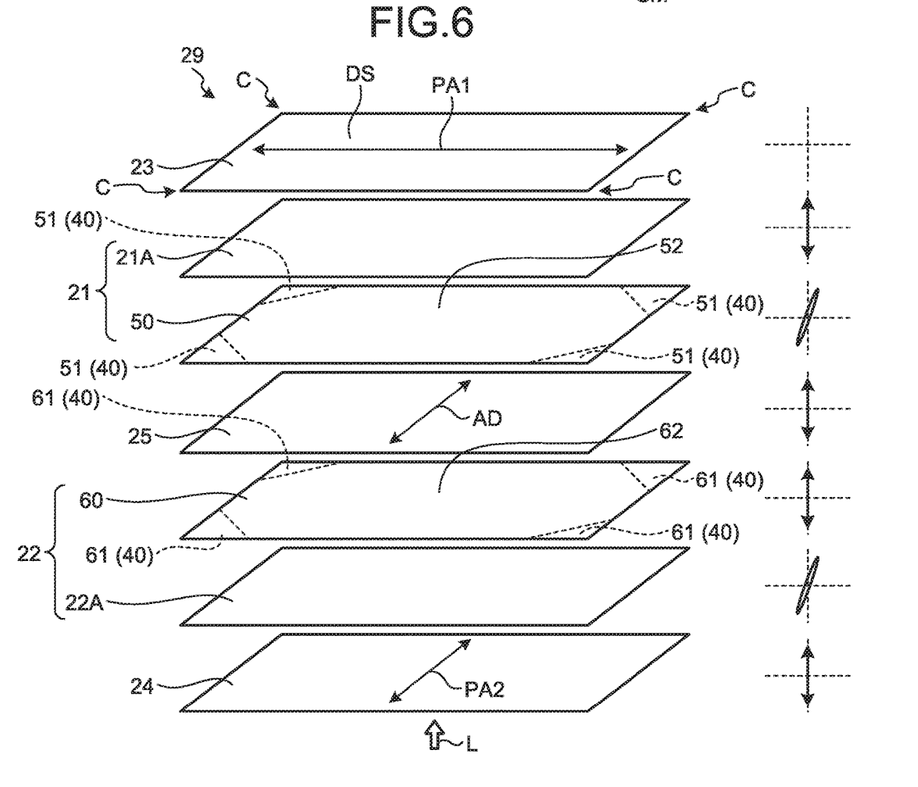
FIG. 6 is a schematic view of a liquid crystal panel according to a second embodiment.

FIG. 6 is a schematic view of a liquid crystal panel 29 according to a second embodiment. The left side diagram in FIG. 6 is a diagram illustrating a layer structure of the liquid crystal panel 29. The right side diagram in FIG. 6 is a diagram illustrating a polarization state of light L that passes through the corner portion C at the time of black display. In the present embodiment, same reference signs will be given to the constituents used in common with the first embodiment, and detailed explanation will be omitted for these.

The difference in the present embodiment from the first embodiment is that the phase compensation member 40 is provided on the first substrate 21 and the second substrate 22. Examples of the phase compensation member 40 include, but are not limited to, a first phase compensation layer 51 and a second phase compensation layer 61. The first phase compensation layer 51 is provided at a position corresponding to each of the corner portions C of the first substrate 21. The second phase compensation layer 61 is provided at a position corresponding to each of the corner portions C of the second substrate 22. In the present embodiment, the following description will be given specifically on an assumption that the force F1 and the force F2 affect the optical characteristics of the liquid crystal panel 20.

The liquid crystal panel 20 includes a first retardation layer 50 provided, for example, across the central portion and each of the corner portions C, of the display screen DS. The first retardation layer 50 provided at a position corresponding to each of the corner portions C has birefringence characteristics. The first retardation layer 50 provided at a position corresponding to the central portion does not have the birefringence characteristics. The first retardation layer 50 provided at each of the corner portions C functions as the first phase compensation layer 51. The first retardation layer 50 provided at a position corresponding to the central portion is an isotropic layer 52 that is optically isotropic.

The first retardation layer 50 is an inner-surface retardation layer provided, for example, on the liquid crystal layer 25 side (inner-surface side) of the first substrate 21. Examples of the first substrate 21 include, but are not limited to, a first base material 21A and the first retardation layer 50 provided on the liquid crystal layer 25 side of the first base material 21A. Examples of the first substrate 21 include, but are not limited to, a color filter layer provided on the first base material 21A, and an overcoat layer to cover this color filter layer. The overcoat layer functions as the first retardation layer 50, for example.

The liquid crystal panel 20 includes a second retardation layer 60 provided, for example, across the central portion and each of the corner portions C, of the display screen DS. The second retardation layer 60 provided at a position corresponding to each of the corner portions C has birefringence characteristics. The second retardation layer 60 provided at a position corresponding to the central portion does not have the birefringence characteristics. The second retardation layer 60 provided at each of the corner portions C functions as the second phase compensation layer 61. The second retardation layer 60 provided at a position corresponding to the central portion is an isotropic layer 62 that is optically isotropic.

The second retardation layer 60 is an inner-surface retardation layer provided, for example, on the liquid crystal layer 25 side (inner-surface side) of the second substrate 22. The second substrate 22 includes a second base material 22A and the second retardation layer 60 provided on the liquid crystal layer 25 side of the second base material 22A, for example. Examples of the second substrate 22 include, but are not limited to, a circuit member provided on the second base material 22A, and an insulating layer covering the circuit member. The circuit member includes a thin film transistor and various types of wiring. The insulating layer covering the circuit member functions as the second retardation layer 60, for example.

The first phase compensation layer 51 is formed by emitting polarized UV light, for example, onto the first retardation layer 50 provided at a position corresponding to the corner portion C. The second phase compensation layer 61 is formed by emitting polarized UV light, for example, onto the second retardation layer 60 provided at a position corresponding to the corner portion C.

Figure 7:
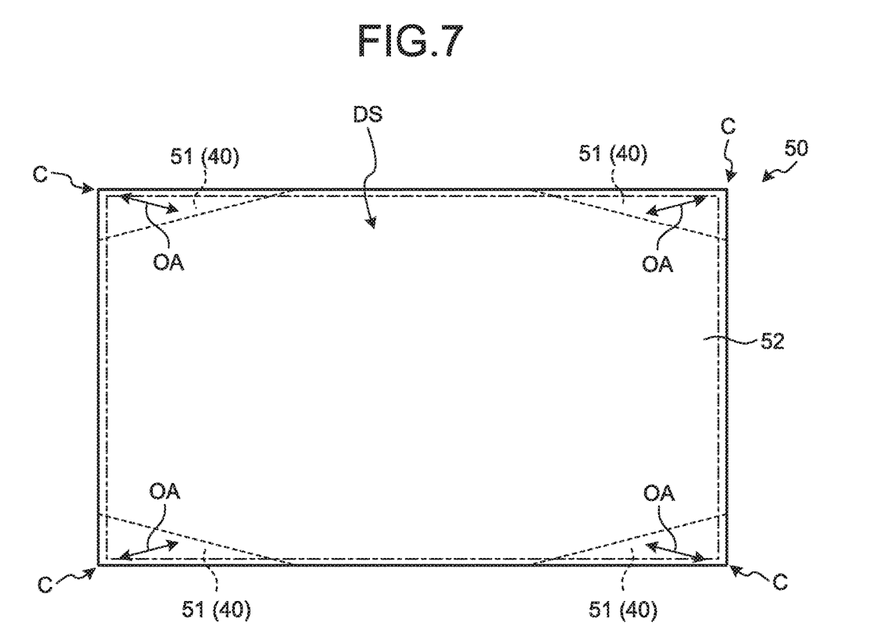
FIG. 7 is a plan view of the first retardation layer.
Figure 8:
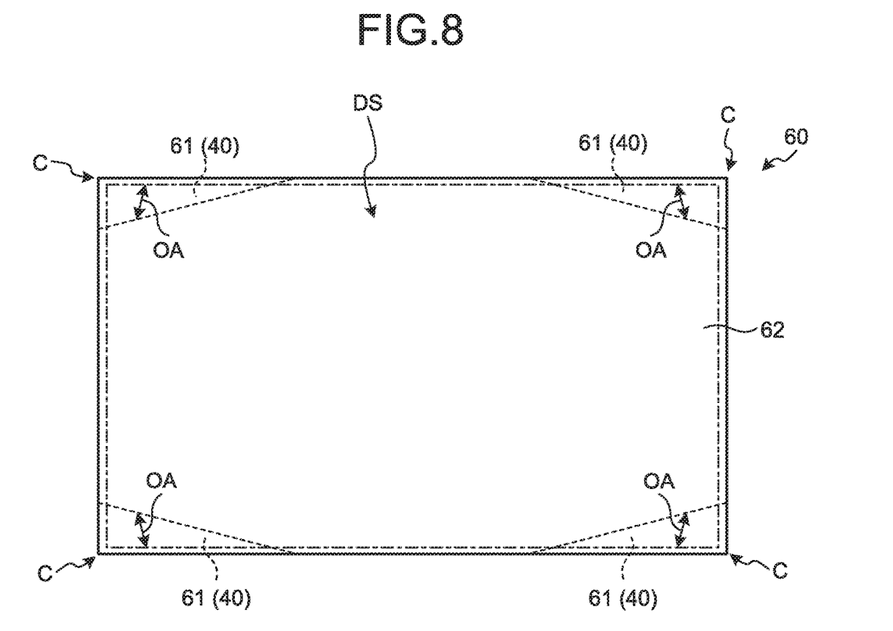
FIG. 8 is a plan view of a second retardation layer.
Figure 9:
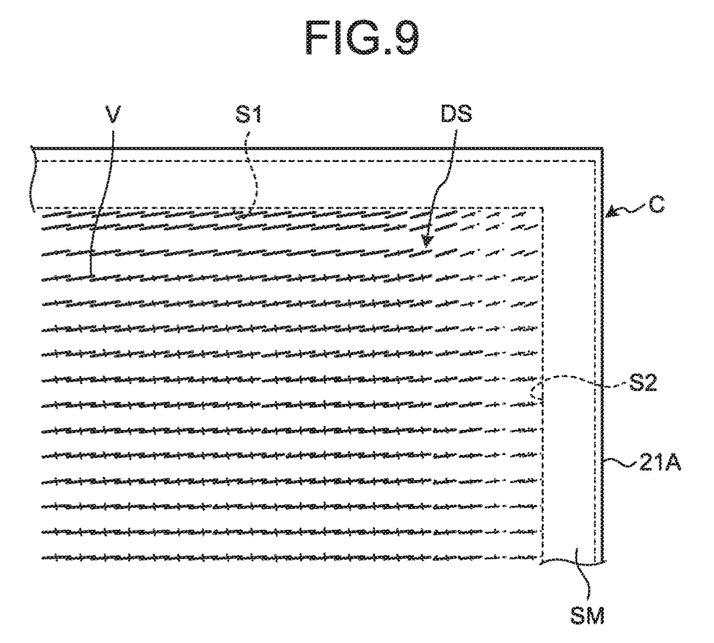
FIG. 9 is a plan view illustrating stress distribution of the first base material, occurring on the corner portion.
Figure 10:
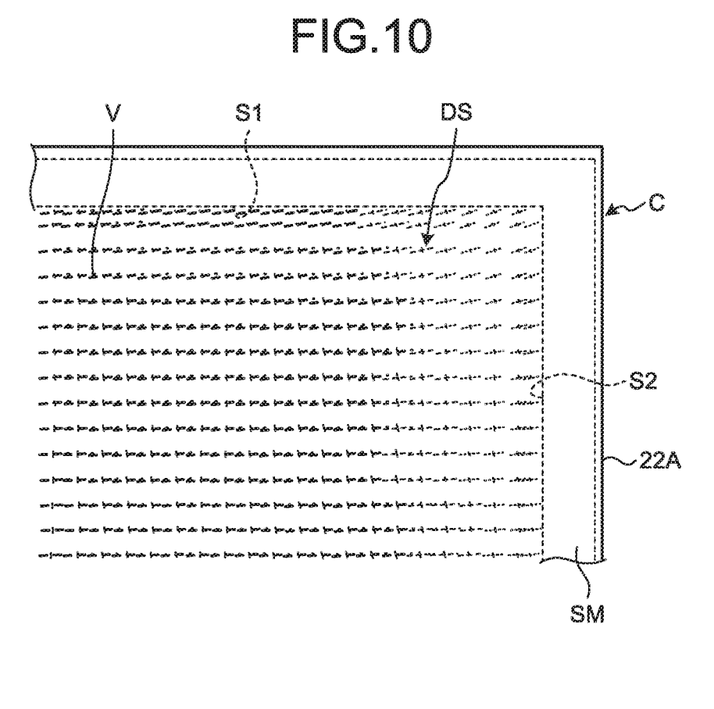
FIG. 10 is a plan view illustrating stress distribution of a second base material, occurring on the corner portion.

FIG. 7 is a plan view of the first retardation layer 50. FIG. 8 is a plan view of the second retardation layer 60. FIG. 9 is a plan view illustrating stress distribution of the first base material 21A, occurring on the corner portions C. FIG. 10 is a plan view illustrating stress distribution of the second base material 22A, occurring on the corner portions C. In FIGS. 9 and 10, the magnitude and direction of each of the force F1 and the force F2 on each of positions is indicated by the length and direction of the stress vector V.

As illustrated in FIGS. 9 and 10, the stress vector V is directed to a direction slightly tilted with respect to the first side S1. The direction of the stress vector V is a direction directed from the corner portion C toward the central portion of the display screen DS. The magnitude and direction of the stress vector V differ depending on the distances from two sides (e.g., first side S1 and second side S2 in FIGS. 9 and 10) intersecting on the corner portion C.

As illustrated in FIG. 7, the first phase compensation layer 51 is provided at a position corresponding to each of the corner portions C of the first retardation layer 50. The direction of a main axis OA (slow axis or fast axis) and layer thickness of the first phase compensation layer 51 positioned at each of the corner portions C are calculated on the basis of distribution of the force F1 in the compression direction of the first base material 21A, that occurs on each of the corner portions C. The main axes OA of the first phase compensation layer 51 provided on two adjacent corner portions C are mutually tilted in opposite directions with respect to one side of the display screen DS, the one side connecting the two corner portions C.

As illustrated in FIG. 8, the second phase compensation layer 61 is provided at a position corresponding to each of the corner portions C of the second retardation layer 60. The direction of a main axis OA (slow axis or fast axis) and layer thickness of the second phase compensation layer 61 positioned at each of the corner portions C are calculated on the basis of distribution of the force F2 in the tension direction of the second base material 22A, that occurs on each of the corner portions C. The main axes OA of the second phase compensation layer 61 provided on two adjacent corner portions C are mutually tilted in opposite directions with respect to one side of the display screen DS, the one side connecting the two corner portions C. The main axis OA of the first phase compensation layer 51 and the main axis OA of the second phase compensation layer 61, provided on the same corner portion C, are mutually tilted in opposite directions with respect to one side of the display screen DS, the one side passing through the corner portion C.

Next, a polarization state of the light L on each of the corner portions C at the time of black display will be described with reference to FIG. 6.

The light L emitted from the backlight 30 (refer to FIG. 1) toward the corner portion C is converted into linearly polarized light by the second polarizing plate 24 and becomes incident on the second substrate 22. As illustrated in FIG. 2, the force F2 in the tension direction acts on the end portion of the second substrate 22. Therefore, a phase difference occurs at the end portion of the second base material 22A due to the photoelastic effect. Accordingly, the light L that passed through the end portion of the second base material 22A becomes elliptically polarized light.

The phase difference given by the second base material 22A is reduced by the second phase compensation layer 61. The light L that passed through the second phase compensation layer 61 changes its polarization state back to the state before incidence on the second base material 22A by the second phase compensation layer 61, and thereafter, becomes incident on the liquid crystal layer 25. In a case where black display is performed, the orientation direction of the liquid crystal layer 25 is parallel with the transmission axis PA2 of the second polarizing plate 24. In the light L converted into the linearly polarized light by the second phase compensation layer 61, the polarization state is not changed by the liquid crystal layer 25.

The light L that passed through the liquid crystal layer 25 is converted into elliptically polarized light by the first phase compensation layer 51. As illustrated in FIG. 2, the force F1 in the compression direction acts on the end portion of the first substrate 21. Therefore, a phase difference occurs at the end portion of the first base material 21A due to the photoelastic effect. Therefore, the first phase compensation layer 51 gives the light L beforehand the phase difference that cancels the phase difference given to the light L when the light L passes through the end portion of the first base material 21A. Accordingly, the light L that passed through the first phase compensation layer 51 is converted into linearly polarized light by passing through the end portion of the first base material 21A, and is absorbed by the first polarizing plate 23.

As described above, also in the present embodiment, the phase difference that occurs on each of the corner portions C of the display screen DS is reduced by the phase compensation member 40 provided at a position corresponding to each of the corner portions C. Accordingly, light leakage is not likely to occur at the corner portions C at the time of performing black display and a good display image is achieve on the entire display screen DS.

While preferred embodiments of the present invention have been described above, the present invention is not limited to these embodiments. Description disclosed in the present embodiments is merely an example and can be modified without departing from the spirit and scope of the present invention. Modifications appropriately performed within the spirit and scope of the present invention understandably are to be included the technical scope of the present invention. All the inventions implementable by performing variations and modification by those skilled in the art within the spirit of the invention are also included in the technical scope of the present invention.

For example, the above-described embodiments assume that the phase compensation member 40 includes one or two layers of phase compensation layers. However, the configuration of the phase compensation member 40 is not limited to these. The phase compensation member 40 may be configured with three or more phase compensation layers.

In the above-described embodiments, each of the first retardation layer and the second retardation layer is configured as an inner surface retardation layer. However, the configuration of each of the first retardation layer and the second retardation layer is not limited to this. For example, each of the first retardation layer and the second retardation layer may be an outer surface retardation layer provided on an opposite side (outer surface side) of the liquid crystal layer 25 side of the first substrate 21 and the second substrate 22.

In the above-described embodiments, each of the first phase compensation layer and the second phase compensation layer is formed by emitting polarized UV light onto a polymeric membrane. However, the formation method of the first phase compensation layer and the second phase compensation layer is not limited to this. While the phase compensation member 40 is formed by modifying a portion of an existing configuration, the method for forming the phase compensation member 40 is not limited to this. It is possible to provide the phase compensation member 40 in a manner so as to be added to the existing configuration.

What is claimed is:

1. A display device including a liquid crystal panel comprising:
   a curved display screen;
   a second substrate arranged oppositely to a first substrate;
   a liquid crystal layer arranged between the first substrate and the second substrate; and
   a phase compensation member provided at a position corresponding to each of corner portions of the curved display screen, the phase compensation member including a first phase compensation layer provided at a position corresponding to each of the corner portions of the first substrate,
   wherein main axes of the first phase compensation layers provided at the two adjacent corner portions are mutually tilted in opposite directions with respect to a side of the display screen, the side connecting the two corner portions.

2. The display device according to claim 1,
   wherein the liquid crystal panel includes a first retardation layer provided across a central portion of the curved display screen and each of the corner portions,
   the first retardation layer provided at a position corresponding to each of the corner portions has birefringence characteristics,
   the first retardation layer provided at a position corresponding to the central portion has no birefringence characteristics, and
   the first retardation layer provided at the position corresponding to each of the corner portions functions as the first phase compensation layer.

3. The display device according to claim 2,
   wherein the first substrate includes a first base material, and the first retardation layer provided on the liquid crystal layer side of the first base material.

4. The display device according to claim 3,
   wherein the first substrate includes an overcoat layer that covers a color filter layer, and
   the overcoat layer functions as the first retardation layer.

5. The display device according to claim 1,
   wherein the phase compensation member includes a second phase compensation layer provided at a position corresponding to each of the corner portions of the second substrate, and
   the main axis of the first phase compensation layer and a main axis of the second phase compensation layer, provided at the same corner portion, are mutually tilted in opposite directions with respect to one side of the display screen, the one side passing through the corner portion.

6. The display device according to claim 5,
   wherein the liquid crystal panel includes a second retardation layer provided across the central portion and each of the corner portions,
   the second retardation layer provided at a position corresponding to each of the corner portions has birefringence characteristics,
   the second retardation layer provided at a position corresponding to the central portion has no birefringence characteristics, and
   the second retardation layer provided at the position corresponding to each of the corner portions functions as the second phase compensation layer.

7. The display device according to claim 5,
   wherein the second substrate includes a second base material, and the second retardation layer provided on the liquid crystal layer side of the second base material.

8. The display device according to claim 1,
   wherein the liquid crystal panel is a lateral electric field system liquid crystal panel.

* * * * *